(12) United States Patent
Rasche et al.

(10) Patent No.: US 7,706,589 B2
(45) Date of Patent: Apr. 27, 2010

(54) ANALYSIS OF A MULTI-DIMENSIONAL STRUCTURE

(75) Inventors: Volker Rasche, Hamburg (DE); Babak Movassaghi, Hamburg (DE); Michael Grass, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 813 days.

(21) Appl. No.: 10/516,151

(22) PCT Filed: May 21, 2003

(86) PCT No.: PCT/IB03/02161

§ 371 (c)(1),
(2), (4) Date: Nov. 30, 2004

(87) PCT Pub. No.: WO03/105017

PCT Pub. Date: Dec. 18, 2003

(65) Prior Publication Data
US 2005/0185831 A1 Aug. 25, 2005

(30) Foreign Application Priority Data
Jun. 5, 2002 (EP) .................................. 02077203

(51) Int. Cl.
*G06K 9/00* (2006.01)
(52) U.S. Cl. .................. 382/131; 382/130; 128/922
(58) Field of Classification Search ................. 382/130, 382/131; 128/922
See application file for complete search history.

(56) References Cited

U.S. PATENT DOCUMENTS 5,175,773 A * 12/1992 Garreau et al. ............. 382/130
6,047,080 A * 4/2000 Chen et al. ................. 382/128
6,048,314 A 4/2000 Nikom
6,148,095 A * 11/2000 Prause et al. ............... 382/131
6,169,917 B1 1/2001 Masotti
6,549,606 B1 * 4/2003 Vaillant et al. ................ 378/4
6,574,500 B2 * 6/2003 Keren ......................... 600/431
7,079,620 B2 * 7/2006 Vaillant et al. ............... 378/41

FOREIGN PATENT DOCUMENTS

EP 1090585 A1 11/2001
WO WO9914700 A1 3/1999

OTHER PUBLICATIONS

Lorenz et al., "Multi-scale line segmentation with automatic estimation of width, contrast and tangential direction in 2D and 3D medical images", 1997, CVRMed-MRCAS'97, Springer Berlin/Heidelberg, vol. 1205/1997, 233-242.*
Yim et al., "Measurement of Stenosis from Magnetic Resonance Angiography Using Vessel Skeletons", 2000, Proceeding of SPIE, vol. 3978, 245-255.*

(Continued)

*Primary Examiner*—Brian P Werner
*Assistant Examiner*—Katrina Fujita

(57) ABSTRACT

A method is provided for analysis of a multi-dimensional structure which includes a tubular structure from two-dimensional datasets for respective pre-determined projection directions. A pair of corresponding initial projected centre points of the tubular structure is identified in two respective initial and further two-dimensional datasets. Projected edges of the tubular structure in said initial two-dimensional datasets and in said further two-dimensional dataset near the respective projected centre points are identified. A local size of the tubular structure is derived at the three-dimensional spatial position of the centre point of the tubular structure from said projected edges and the predetermined projection directions.

8 Claims, 2 Drawing Sheets

OTHER PUBLICATIONS

Figure 1:
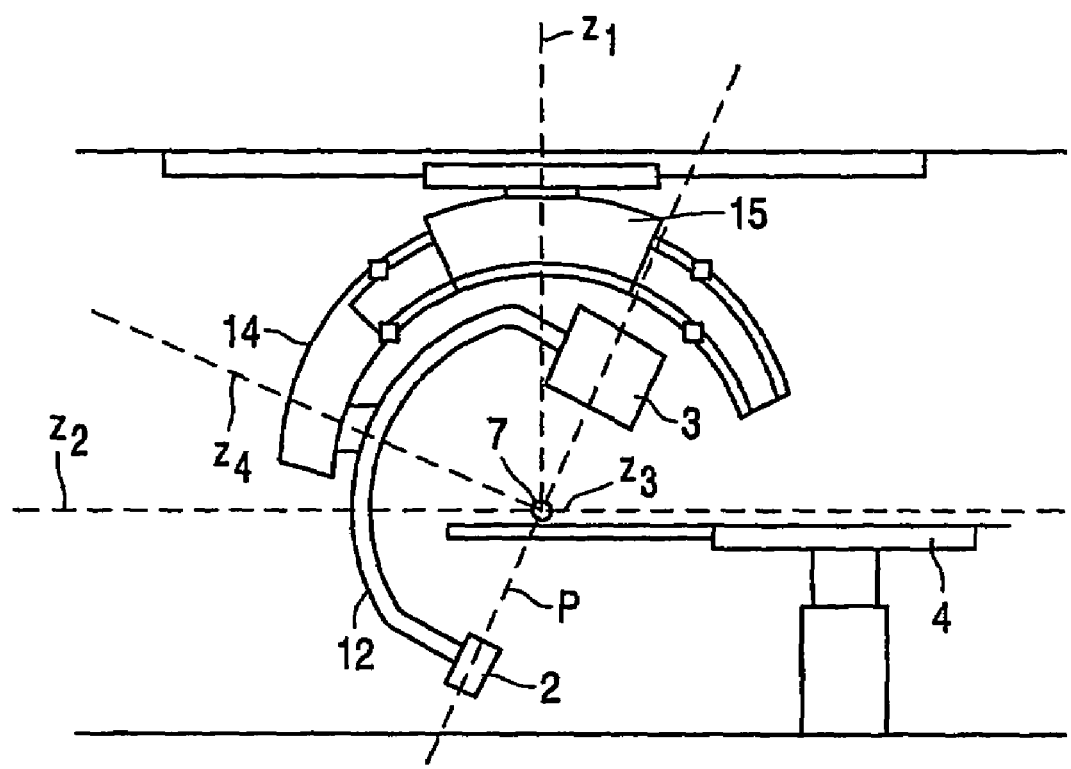

Henri et al., "Reconstruction of 3-D Branching Structures", 1991, Springer Berlin, vol. 511/1991, 65-80.*

E. Coste et al., "3D Reconstruction of the Cerebral Arterial Network from Stereotactic DSA", Medical physics, American Institute of Physics, NY, USA, vol. 26, No. 9, Sep. 1999, pp. 1783-1793, XP000930205.

B. Movassaghi, "3D Reconstruction by Modeling of Coronary Arteriograms", Heinrich-heine University, Dusseldorf, DE, Philips Research, Technical Systems Dept., Hamburg, DE, 2001.

S. James, '3D Reconstruction of Coronary Arterial Tree to Optimize Angiographic Visualization, IEEE Tr. Med Image, 19 (2000) 318-336.

H. Lemke et al., "CAR '96: Computer Assisted Radiology", Proceedings of the Int'l Symposium on Computer and Communication Systems for Image Guided Diagnosis and Therapy, Paris, Jun. 1996.

R. Windyga et al., 'Three-Dimensional Reconstruction of the Coronary Arteries using a Priori Knowledge, Medical and Biological Engineering and Computing, Peter Peregrinus LTD., Stevenage, GB, vol. 36, No. 2, Mar. 1998, pp. 158-164, XP000739381.

\* cited by examiner

ANALYSIS OF A MULTI-DIMENSIONAL STRUCTURE

The invention pertains to a method for analysis of a multi-dimensional structure which includes a tubular structure from two-dimensional datasets.

Such a method for analysis is known from the paper '*3D reconstruction of coronary arterial tree to optimise angiographic visualisation*', by S. James Chen and John D. Carroll in IEEE Tr.Med.Imag.19(2000)318-336

The known method concerns reconstruction of a three-dimensional coronary arterial tree from two-dimensional datasets in the form of a sequence of x-ray angiograms. Such angiograms are made by injecting a patient to be examined with a contrast agent and passing x-rays from an x-ray source through the patient. The known method employs acquisition of two standard x-ray angiogram cine image sequences at respective orientations or views of the x-ray source relative to the patient. A pair of these cine images relating to corresponding phases of the heart is identified. This pair of identified corresponding cine images functions as the initial two-dimensional datasets. From each of the cine images of the corresponding pair, there are constructed vessel hierarchies that are represented by mathematical hierarchical digraph. Subsequently, a transformation characterising a spatial relationship between the views of the pair of corresponding cine images is constructed. This transformation is calculated as an optimum estimate of 3D bifurcation points given the set of 2D bifurcation points in the hierarchical digraphs. The optimum estimate is obtained as the least squares errors of the 3D bifurcation points given sets of 2D bifurcation points. Notably, the known method is employed by an x-ray examination apparatus having a moveable gantry which carries the x-ray source and an image intensifier. The gantry angulations determine the orientation of the cine images. Inaccurate values for gantry angulations are recorded in the x-ray examination apparatus. The recorded values of the gantry angulations are employed as an initial estimate of the transformation that is calculated from the hierarchical bi-graphs.

An object of the invention is to provide a method of analysis of an multi-dimensional structure including a tubular structure which produces more accurate results for the local sizes of the tubular structure.

This object is achieved according to the invention by a method for analysis of a multi-dimensional structure which includes a tubular structure from two-dimensional datasets for respective pre-determined projection directions, the method comprising the steps of identifying at least one pair of corresponding initial projected centre points of the tubular structure in two respective initial two-dimensional datasets, identifying at least one further projected centre point corresponding to said initial projected centre points in at least one further two-dimensional dataset, derive a three-dimensional spatial position of the centre point of the tubular structure corresponding to said projected centre points, identify projected edges of the tubular structure in said initial two-dimensional datasets and in said further two-dimensional dataset near the respective projected centre points and derive a local size of the tubular structure at the three-dimensional spatial position of the centre point of the tubular structure from said projected edges and the pre-determined projection directions.

The invention is based on a set of two-dimensional datasets for pre-determined projection directions. Notably, these two-dimensional datasets are formed as digitised x-ray images for respective predetermined projection directions. The projection directions are pre-determined as the x-ray projection images are generated by an x-ray examination apparatus having pre-calibrated orientations of the x-ray source and x-ray detector. Such a pre-calibrated x-ray examination apparatus is described in the international application EP01/12743 (PHNL000587).

According to the present invention there are identified corresponding initial projected centre points of the tubular structure in two initial two-dimensional datasets. These projected centre points are corresponding in that they pertain to the same centre point in the tubular structure in the multi-dimensional dataset. The corresponding initial projected centre points are for example identified on the basis of features in the two-dimensional dataset that are well recognised. For example, the tubular structure may relate to a part of a patient's system of bloodvessels, notably the coronary arterial vessel tree. In the two-dimensional datasets representing projections of the system of bloodvessels, the initial projected centre points can be accurately identified on the basis of anatomical information in the projection images forming the two-dimensional datasets. Notably, suitable anatomical features are bifurcation points of the branched vessel structure which are often well recognised in the two-dimensional datasets when displayed on a display screen.

Subsequently, the position in three-dimensional geometric space of the centre point in the tubular structure is calculated from the pre-determined projection directions of the initial two-dimensional datasets and the location of the initial projected centre points in these initial two-dimensional datasets. To obtain accurate values for the local size of the tubular structure in at least one further projected two-dimensional dataset at least one further projected centre point is identified. This further projected centre point also corresponds to the centre point in the tubular structure that corresponds to the initial projected centre points. That is, the initial projected centre points and further centre points in one or several further two-dimensional datasets all pertain to the same centre point in the tubular structure. In the initial two-dimensional datasets and in the further two-dimensional datasets projected edges of the tubular structure are identified locally at the projected centre points in the respective two-dimensional datasets. There are various ways to identify the projected edges e.g on the basis of (i) local differences between brightness values or grey values or (ii) local gradients of brightness or grey values in the two-dimensional datasets. From these projected edges and the pre-determined projection directions of the respective two-dimensional datasets an accurate estimate is computed of notably the cross-sectional size of the tubular structure. In particular the projected edges in the respective two-dimensional datasets and their pre-determined projection direction yield an inscribed polygon of the local cross-sectional area of the tubular structure locally at the centre point at issue. Consequently, the more two-dimensional datasets for different projection directions are employed, the larger the number of vertices of the inscribed polygon and the more accurate the estimate of the local cross section of the tubular structure on the basis of the inscribed polygon.

These and other aspects of the invention will be further elaborated with reference to the embodiments defined in the dependent Claims.

Preferably on the basis of the projection directions of the initial two-dimensional datasets and the spatial position of the centre point the first epipolar line is computed as the intersection of the projection plane of the second initial two-dimensional dataset and the plane spanned by the projection directions of the initial two-dimensional dataset and containing the centre point at issue in the tubular structure. The initial projected centre point in the second initial two-dimensional dataset is easily identified on the epipolar line, since only positions on the epipolar line need be considered. Moreover, the position of the projected centre point on the epipolar line is obtained very accurately. The accuracy of the position of the projected centre point in the second initial two-dimensional dataset is determined by the accuracy of the calibration of the pre-determined projection directions. It appears that the pre-determined projection directions can be calibrated at such accuracy that the position of the projected centre point is determined far more accurately than the pixel-size in the two-dimensional dataset.

It is noted that further epipolar lines can be computed for any further pair of two-dimensional dataset for respective projection directions. Projected centre points are located on such epipolar lines so that identification is easily done since only positions on the epipolar line need be considered. Projected centre points can also be identified as intersections of epipolar lines pertaining to respective pairs of projection directions.

In a further preferred implementation of the method according to the invention, projected centre lines of the projections of the tubular structure are constructed. These projected centre lines represent the projections of the local longitudinal axes of the tubular structure. For example the projected centre lines represent the central axis along the lumen of the blood vessel at issue as projected in the x-ray projection image. The projected centre lines are obtained from respective series of projected centre points in the individual two-dimensional datasets. Such series of projected centre points can be obtained in the same way as discussed above for the corresponding initial projected centre point and further projected centre points. The projected centre lines are for example found by connecting subsequent projected centre points in the individual two-dimensional datasets. In individual two-dimensional datasets the projected centre lines are corrected on the basis of the datavalues in the two-dimensional dataset at issue. For example the correction of the projected centre lines may be carried-out on the basis of a distribution of datavalues near the projected centre lines, on the basis of local gradients of the datavalues, local differences between datavalues or on the local Hessian matrix (i.e. local spatial $2^{nd}$ derivatives) of the datavalues near the projected centre line. Thus, on the basis of the datavalues close to the projected centre line, the location of the centre line is corrected. Consequently, the positions of the projected centre points are corrected and made more accurate. Thus, also the accuracy of the local size of the tubular structure is improved.

In particular the local size of the tubular structure is calculated as the local diameter at the centre point at issue and transversely to the corrected projected centre line. In this way the local size of the tubular structure is calculated in the respective projection directions. In this way complicated shapes, different from a circular form, of the cross section of the tubular structure is taken into account.

Accurate results for in particular the projected centre line(s) are found when the initial two-dimensional datasets have projection directions that enclose an angle in the range of 30° to 150°. Very accurate results are found when the projection directions of the initial two-dimensional datasets differ about 90°. Preferably, the projection directions of the further two-dimensional datasets enclose an angle also within the range between 30° to 150°. Consequently, the range of projection directions for which the two-dimensional dataset need to be acquired is less than the full range of 180° so that accordingly the time to acquire the two-dimensional datasets is reduced. Further, it appears that the angle enclosed between the projection directions of the initial two-dimensional datasets may be selected anywhere in the range of 30° to 150°, an in particular cumbersome setting said angle at 90° is not necessary. However, it is noted for projections that differ about 90°, overlap and foreshortening of the projected tubular structure are relatively less so that corresponding centre points are easily identified.

Preferably, in particular when (almost) periodic motion occurs in the tubular structure time gated acquisition of the two-dimensional dataset is employed. In time gated acquisition the datavalues of the respective two-dimensional datasets are acquired in successive time periods in which the state of motion of the tubular structure is essentially the same. For example successive two-dimensional datasets at respective projection directions at periodic instants in time at which essentially the same motion state recurs. Consequently, the two-dimensional datasets form in effect a stroboscopic representation of the tubular structure at respective projection directions. For example when the tubular structure pertains to the system of bloodvessels of the patient's heart, time gated acquisition can be carried out by ECG-triggered acquisition.

The method of the invention, in particular when applied to the bloodvessel system of the patient to be examined leads to an adequate spatial rendition of the bloodvessel structure which is a useful technical tool for the physician to examine the patient's bloodvessel system.

The invention further relates to a computer programme as defined in Claim 7. The computer programme according to the invention can be loaded in the working memory of a computer so as to allow the computer to carry-out the method of the invention. The computer programme can be supplied on a data carrier such as a CD-ROM or the computer programme can be downloaded from a data network such as the world-wide web. The invention also relates to a workstation as defined in Claim 8. The workstation is arranged to carry-out the method of the invention and to that end the workstation is provided with hardware circuitry of a processor for carrying out the method steps or a computer programme according to the invention is stored in the working memory of the processor. Preferably, the workstation according to the invention is set up with an x-ray examination apparatus such that image data from the x-ray examination apparatus are supplied to the workstation as the two-dimensional datasets.

Figure 2:
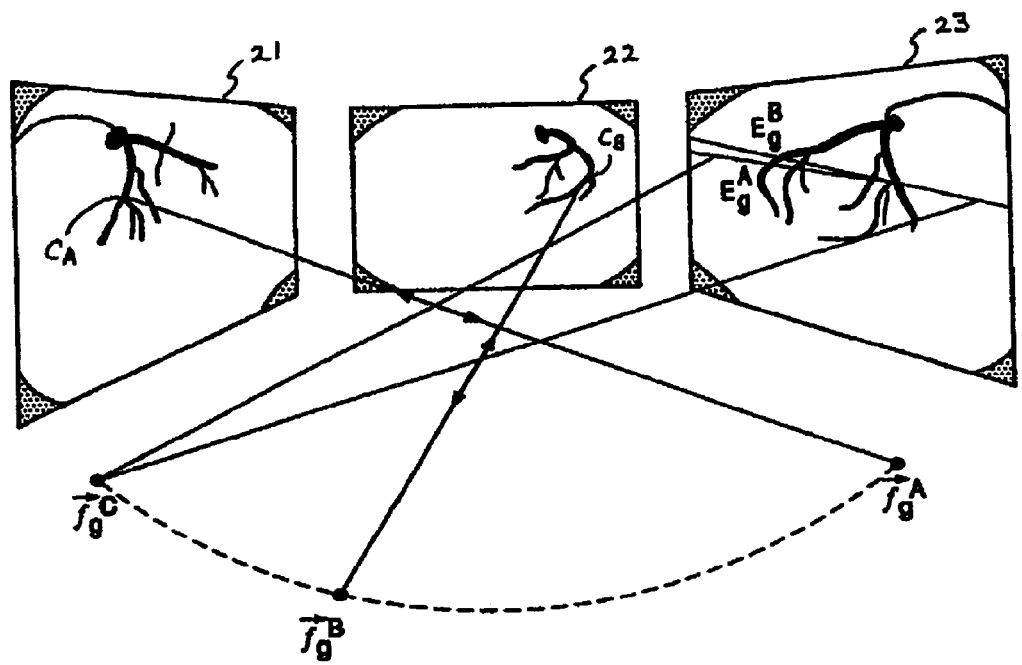
Figure 3:
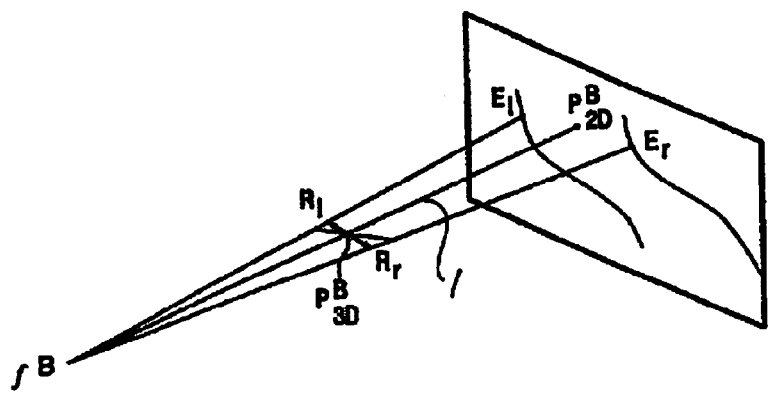

These and other aspects of the invention will be elucidated with reference to the embodiments described hereinafter and with reference to the accompanying drawing wherein FIG. 1 shows an x-ray examination apparatus in which the invention is employed, FIG. 2 shows a diagrammatic representation of the identification of centre points in respective two-dimensional datasets on the basis of epipolar lines as employed in the method of the invention and FIG. 3 shows a diagrammatic representation of the identification of projected edges of the tubular structure and of the derivation of the local size of the tubular structure as employed in the method of the invention.

FIG. 1 shows an x-ray examination apparatus in which the invention is employed. The x-ray examination apparatus comprises an x-ray source 2 and an x-ray detector 3 which are mounted on an inner C-arm 12. The inner C-arm 12 is mounted on a outer C-arm 14, such that the inner C-arm 12 can rotate around an axis $z_4$ which is in the plane of the inner C-arm. The axis $z_4$ is often termed the 'propellor-axis'. The outer C-arm 14 is mounted in a sleeve 15 which is suspended from the ceiling. The sleeve 15 is rotatable around axis $z_1$, which extends transverse to the long axis of the sleeve 15, in this example the axis $z_1$ is vertical. The outer C-arm 14 is moveable through the sleeve 15 so as to rotate the x-ray source 2 with the x-ray detector 3 around an axis $z_3$, consequently the propellor axis $z_4$ can be set at an angle $\alpha$ to the horizontal axis $z_2$.

The object to be examined, such as a patient to be radiologically examined is placed on the patient table 4. Several two-dimensional datasets are made by positioning the x-ray source and x-ray detector according to respective pre-determined projection directions. The pre-determined projection directions are achieved by displacing the outer C-arm 14 so as to set the propellor axis $z_4$ and to rotate the inner C-arm 12 around the propellor axis.

The two-dimensional datasets are produced in the form of x-ray projection images, which are formed on the input face of the x-ray detector 3. Namely, owing to differences in the x-ray attenuation in the patient to be examined, spatial intensity variations occur in the x-ray beam having passed through the patient to be examined. These spatial brightness variations give rise to a different brightness values in the x-ray image formed on the input face of the x-ray detector 3. The x-ray detector may be an x-ray image intensifier having an input screen as the input face, or the x-ray detector may be a flat x-ray detector which includes a sensor matrix of x-ray sensitive sensor elements which form the input face. Preferably, the x-ray images are digitised in an analogue-to-digital converter that is provided in the output circuit of the x-ray detector 3. These digitised x-ray images form the two-dimensional datasets.

FIG. 2 shows a diagrammatic representation of the identification of centre points in respective two-dimensional datasets on the basis of epipolar lines as employed in the method of the invention. The two initial two-dimensional datasets 21,22 represent x-ray images formed by x-irradiating the patient's heart to be examined from respective positions $f^A$ and $f^B$ the x-ray source 2, in particular of the x-ray focus in the x-ray source. Accordingly, the x-ray images show respective projections of the patients coronary vessel structure. The contrast of the vessels is enhanced as an x-ray absorbing contrast agent has been administered to the patient's blood. Corresponding centre points $C_A$ and $C_B$ are indicted in the respective two-dimensional datasets 21,22. Notably, the corresponding centre points $C_A$ and $C_B$ are chosen as an anatomically easily recognised as a bifurcation point in the vessel structure.

At least one further two-dimensional dataset in the form of an x-ray image 23 taken from x-ray source position $f^C$. The first and second epipolar lines $E^A$ and $E^B$ are shown. The first epipolar line $E^A$ is the line of intersection of the plane onto which the x-ray image associated with two-dimensional dataset 23 is projected in the plane spanned by the projection directions of the first initial two-dimensional dataset 21 and of the further two-dimensional dataset 23. Similarly, the second epipolar line $E^B$ is the line of intersection of the plane onto which the x-ray image associated with two-dimensional dataset 23 is projected in the plane spanned by the projection directions of the second initial two-dimensional dataset 22 and of the further two-dimensional dataset 23. As the centre points $C_A$ and $C_B$ both correspond to the same centre point in the patient's vessel structure, the corresponding centre point in the further two-dimensional dataset 23 is found as the intersection of both epipolar lines.

FIG. 3 shows a diagrammatic representation of the identification of projected edges of the tubular structure and of the derivation of the local size of the tubular structure as employed in the method of the invention. For individual elements of a vessel, the 3D centreline points are calculated having a corresponding 2-D centerline point in every projection. For each of these points, two edge point pairs ($E_r$, $E_l$) exist from which two radius vectors ($R_r$, $R_l$) can be reconstructed as follows. First the minimum distance between the line l connecting the image point $P^B_{2D}$ and its corresponding focal spot $f^B$ and the 3D centreline point $P^B_{3D}$ is calculated. The corresponding point on the line L is defined as $P^B_{3D}$. If the 3D centrelines calculation involves more than two projections the distance will not be zero due to the errors mentioned above. The two vectors pointing perpendicular from $P^B_{3D}$ to the edges of the triangle defined by the points $E_r$, $E_l$ and the focal spot $f^B$ are the sought radius vectors $R_r$ and $R_l$. The vessel lumen can be estimated from a single view by use of the measured vessel size in the image assuming circularity of the vessel lumen. When two views are acquired elliptical cross section can be employed. For more than two projections, interpolation is performed. The quality of this estimation increases with the number of projections used.

The invention claimed is:

1. A method for analyzing a multi-dimensional structure which includes a tubular structure having local sizes, from two-dimensional x-ray image datasets for pre-determined projection directions, the method comprising using a computer to perform the steps:

identifying at least one pair of corresponding initial projected centre points of the tubular structure in two respective initial two-dimensional x-ray image datasets, identifying at least one further projected centre point corresponding to said initial projected centre points in at least one further two-dimensional x-ray image dataset, deriving a three-dimensional spatial position of the centre point of the tubular structure corresponding to said initial and said at least one further projected centre points, identifying projected edges of the tubular structure locally in said initial two-dimensional x-ray image datasets and in said further two-dimensional x-ray image dataset near the respective projected centre points, wherein identifying includes identifying on the basis of local differences between (i) brightness or grey values or (ii) local gradients of brightness or grey values in the corresponding two-dimensional x-ray image datasets and deriving a local size of the tubular structure at the three-dimensional spatial position of the centre point of the tubular structure from (i) said projected edges and (ii) the predetermined projection directions, wherein deriving the local size yields an inscribed polygon of local cross-sectional area of the tubular structure locally at the centre point at issue, edges of said inscribed polygon corresponding to said projection edges, a number of vertices of said inscribed polygon corresponding to a number of the two-dimensional x-ray image datasets.

2. The method of claim 1, wherein identifying the at least one pair of corresponding initial projected centre points involves identifying a first initial projected centre point in a first initial two-dimensional x-ray image dataset computing a first epipolar line as the intersection of a projection plane of a second initial two-dimensional x-ray image dataset and the plane spanned by the projection directions of said initial two-dimensional x-ray image datasets and identifying a second initial projected centre point in the second initial two-dimensional x-ray image dataset on the first epipolar line in the second initial two-dimensional x-ray image dataset.

3. The method of claim 1, wherein
in at least one of the two-dimensional x-ray image datasets a series of projected centre points is identified
in said at least one two-dimensional x-ray image dataset a projected centre line is derived from said series of projected centre points
said projected centre line is corrected on the basis of a distribution of data values in the at least one two-dimensional x-ray image dataset near the projected centre line.

4. The method of claim 3, wherein the local size of the tubular structure is derived from an intersection of the identified projected edges in said at least one two-dimensional x-ray image dataset and a direction transverse to the corrected projected centre line.

5. The method of claim 1, wherein the initial two-dimensional x-ray image datasets have projection directions enclosing an angle in the range of 30° to 150°.

6. The method of claim 1, wherein the two-dimensional x-ray image datasets are acquired by way of time-gated data-acquisition.

7. A computer readable storage medium storing instructions executable by a computer, the instructions being operable to perform the steps:
identifying at least one pair of corresponding initial projected centre points of the tubular structure in two respective initial two-dimensional x-ray image datasets,
identifying at least one further projected centre point corresponding to said initial projected centre points in at least one further two-dimensional x-ray image dataset,
deriving deriving a three-dimensional spatial position of the centre point of the tubular structure corresponding to said initial and said at least one further projected centre points,
identifying projected edges of the tubular structure locally in said initial two-dimensional datasets and in said further two-dimensional x-ray image dataset near the respective projected centre points, wherein identifying includes identifying on the basis of local differences between (i) brightness or grey values or (ii) local gradients of brightness or grey values in the corresponding two-dimensional x-ray image datasets and
deriving a local size of the tubular structure at the three-dimensional spatial position of the centre point of the tubular structure from (i) said projected edges and (ii) the predetermined projection directions, wherein deriving the local size yields an inscribed polygon of local cross-sectional area of the tubular structure locally at the centre point at issue, edges of said inscribed polygon corresponding to said projection edges, a number of vertices of said inscribed polygon corresponding to a number of the two-dimensional x-ray image datasets.

8. A workstation comprising an x-ray examination apparatus and a computer, the computer programmed to perform the steps:
identifying at least one pair of corresponding initial projected centre points of the tubular structure in two respective initial two-dimensional x-ray image datasets,
identifying at least one further projected centre point corresponding to said initial projected centre points in at least one further two-dimensional x-ray image dataset,
deriving a three-dimensional spatial position of the centre point of the tubular structure corresponding to said initial and said at least one further projected centre points,
identifying projected edges of the tubular structure locally in said initial two-dimensional x-ray image datasets and in said further two-dimensional x-ray image dataset near the respective projected centre points, wherein identify includes identifying on the basis of local differences between (i) brightness or grey values or (ii) local gradients of brightness or grey values in the corresponding two-dimensional x-ray image datasets and
deriving a local size of the tubular structure at the three-dimensional spatial position of the centre point of the tubular structure from (i) said projected edges and (ii) the predetermined projection directions, wherein deriving the local size yields an inscribed polygon of local cross-sectional area of the tubular structure locally at the centre point at issue, edges of said inscribed polygon corresponding to said projection edges, a number of vertices of said inscribed polygon corresponding to a number of the two-dimensional x-ray image datasets.

* * * * *